(12) United States Patent
Kabasawa

(10) Patent No.: US 7,082,084 B2
(45) Date of Patent: Jul. 25, 2006

(54) OPTICAL PICKUP APPARATUS

(75) Inventor: Hidetoshi Kabasawa, Saitama-ken (JP)

(73) Assignee: TEAC Corporation, Tokyo (JP)

( * ) Notice: Subject to any disclaimer, the term of this patent is extended or adjusted under 35 U.S.C. 154(b) by 369 days.

(21) Appl. No.: 10/254,276

(22) Filed: Sep. 25, 2002

(65) Prior Publication Data

US 2003/0067848 A1 Apr. 10, 2003

(30) Foreign Application Priority Data

Sep. 28, 2001 (JP) .............................. 2001-303990

(51) Int. Cl.
*G11B 7/09* (2006.01)
(52) U.S. Cl. ............................. 369/44.16; 369/44.14; 369/44.22; 369/44.32; 369/112.29
(58) Field of Classification Search ............ 369/44.06, 369/44.11, 44.14, 44.15, 112.23, 44.16, 44.22, 369/44.32, 112.29; 359/813, 823, 814, 824; 720/681, 683
See application file for complete search history.

(56) References Cited

U.S. PATENT DOCUMENTS

| | | | | |
|---|---|---|---|---|
| 5,018,836 A | * | 5/1991 | Noda et al. | 359/814 |
| 5,323,369 A | * | 6/1994 | Kim | 369/44.15 |
| 5,488,603 A | * | 1/1996 | Tomita et al. | 720/683 |
| 5,511,049 A | * | 4/1996 | Goda | 369/44.15 |
| 5,663,840 A | * | 9/1997 | Matsui | 359/814 |
| 6,181,670 B1 | * | 1/2001 | Nagasato | 720/681 |
| 6,295,255 B1 | | 9/2001 | Seo et al. | 369/44.32 |
| 6,496,451 B1 | * | 12/2002 | Kimura et al. | 369/44.14 |
| 6,768,601 B1 | * | 7/2004 | Ju | 359/824 |

FOREIGN PATENT DOCUMENTS

| | | |
|---|---|---|
| JP | A 62-031036 | 2/1987 |
| JP | A 04-162220 | 6/1992 |
| JP | 8-339557 | 12/1996 |
| JP | 10-040560 A | 2/1998 |
| JP | A 2000-149292 | 5/2000 |
| JP | A 2000-182258 | 6/2000 |
| JP | 2001-093177 A | 4/2001 |

(Continued)

OTHER PUBLICATIONS

Japanese Office Action (English translation) dated Aug. 3, 2004, in corresponding Japanese Patent Application No. 2001-303990 filed Sep. 28, 2001.

*Primary Examiner*—William Korzuch
*Assistant Examiner*—Kim-Kwok Chu
(74) *Attorney, Agent, or Firm*—Weingarten, Schurgin, Gagnebin & Lebovici LLP

(57) ABSTRACT

It is an object of the present invention to provide an optical pickup apparatus appropriate for the notebook PC that can prevent structural resonance of the lens holder by arranging the focus coil and the tracking coil in a way to stabilize the weight balance, enable the tilt servo, and be composed in an extremely reduced thickness. An optical pickup apparatus composed to adjust the irradiation position of light beam to an optical disk by displacing an objective lens through a driving control of a lens holder holding the objective lens with a moving coil method, wherein an objective lens driving section is composed by arranging and fixing focus coils 7*a*, 7*b* so that a pair of coil main bodies be symmetrical about the objective lens 4 arranged at the middle of the lens holder 4, and arranging a pair of tracking coils 8*a*, 8*b*, 8*c*, 8*d* at both sides of the respective focus coils.

12 Claims, 9 Drawing Sheets

FOREIGN PATENT DOCUMENTS

| | | |
|---|---|---|
| JP | A 2001-093173 | 4/2001 |
| JP | 2001-184693 | 7/2001 |
| JP | A 2001-216665 | 8/2001 |

* cited by examiner (Prior Art)

(Prior Art)

OPTICAL PICKUP APPARATUS

BACKGROUND OF THE INVENTION

1. Field of the Invention

The present invention concerns an optical pickup apparatus for an optical disk apparatus improved in order to build in a personal computer ("PC" hereinafter), especially in a notebook PC.

2. Detailed Description of the Prior Art

In general, a PC is equipped as standard with an optical disk apparatus for reproducing record of or recording information in an optical disk abbreviated to CD (compact disk), DVD (digital versatile disk), which is essential for processing information powerfully and at the same time required to present a high accuracy and reliability according to the increase of storage density and the increase of readout speed, writing speed or others.

FIG. 9 shows an optical pickup apparatus for an optical disk apparatus adopted relatively largely for a desk top PC, and the same apparatus is so composed that, a light beam emitted from an semiconductor laser device 101 transmits a beam splitter 102 and enters an objective lens 104 installed in a lens holder 103. Then, this objective lens 104 collects the light beam and spots of beam are formed in fine pits formed on a recording surface of an optical disk D.

The beam reflected from the recording surface of the optical disk D returns transmitting the objective lens 104 and is reflected in a right angle direction by the beam splitter 102. Then, the light beam intensity detected by a photodiode 105 enables to read the record bits on the optical disk D.

By the way, as face run-out or eccentricity exist, for a rapidly rotating optical disk D, it is composed to irradiated the recording bit of the optical disk D with a spot of the beam correctly all the times, by making the objective lens 104 follow, in respect to this face run-out or eccentricity, by an objective lens driving apparatus.

This objective lens driving apparatus is the one where a focus coil 106 is wound on a side face of the lens holder 103 for holding the objective lens 104, and further tracking coils 107 are disposed by one pair respectively on the opposite two faces. Then, a permanent magnet 108 and a yoke base 109 are arranged in a way to pinch these focus coils 106 and the tracking coil 107, and compose a magnetic circuit. The lens holder 103 is supported by a suspension wire 110 and a suspension holder 111, and the whole lens holder 103 is driven by a control current supplied to the focus coil 106 and the tracking coil 107, so that the objective lens 104 can be positioned correctly.

Next, an optical pickup apparatus shown in FIG. 10 has been developed for an optical disk apparatus to be built in a notebook PC and respective components are composed extremely flat, in order to integrate in a flat body of the notebook PC. In the same drawing, the symbol 112 is a lens holder, holding an objective lens 113 at the front end and a focus coil 114 at the rear end. Two tracking coils 115 are affixed to an open end face of the focus coil, and the focus coil 114 and the tracking coil 115 are supported by a suspension wire 118 and a suspension holder 119 so that they are positioned simultaneously in a magnetic circuit formed by permanent magnets 116, 117. Then it is so composed that light beam incident transversely into a rising mirror 121 arranged in a frame body (not shown) under a yoke base 120 be incident to the objective lens 113.

SUMMARY OF THE INVENTION

In the optical pickup apparatus composed as shown in FIG. 9, there is globally no mass-bias, because the focus coil 106 and the tracking coil 107 are arranged point-symmetrically about the objective lens 104. The driving force generated by the coil act equally to the center of gravity, the lens holder 103 would not tilt even if tracking servo or focus servo is performed with low driving frequency. Moreover, the lens holder 103 does not resonate, advantageously, even if tracking servo or focus servo is performed with a high driving frequency.

Nonetheless, in the optical pickup apparatus of such composition, as the light beam is incident from the bottom face of the lens holder 103, it is necessary to arrange optical components in a lower portion of the yoke base 109. Such a composition increases the thickness of the whole optical disk apparatus and is inappropriate for the notebook PC, but may be admitted for the desktop PC having a large cabinet capacity.

On the other hand, according to a remarkable tendency of thinning the notebook PC, the composition of the optical pickup apparatus as shown in FIG. 10 comes to be adopted largely, in order to cope with this thinning. In case of this composition, the lens holder 112 should be formed as flat as possible. On the other hand, an extremely expensive material such as highly elastic liquid crystal polymer or the like should be adopted in order to prevent the resonance.

In addition, this composition biases the weight balance, because on one side there is only one pair of tracking coils 115 to be attached to the focus coils 114 fixed to the lens holder 112. Moreover, as the coil portion and the objective lens 113 are positioned at an extreme end in the longitudinal direction, the composition of the whole does not become a point symmetrical composition about the objective lens as the optical pickup apparatus as shown in FIG. 9 adopted for the desktop PC, but becomes a cantilever support structure presenting an extremely inferior weight balance.

In such a composition that can not constitute a composition making the coil arrangement point symmetrical and cantilevers the lens holder 112 having a long distance between the objective lens 113 and the coil becoming the driving source and an inferior weight unbalance, when a tracking servo or focus servo is executed, the lens holder 112 tilts at a low driving frequency, the lens holder 112 generates a high order resonance at a high frequency, that can not be controlled even if a material of high elasticity such as liquid crystal polymer or others are adopted.

There, when a resonance is generated in the lens holder 112, the beam spot by the objective lens comes naturally in the resonance state, disabling a correct focus servo or tracking serve. Especially for a higher speed, high record density DVD of about 0.74 μm in track width, there is every possibility that the resonance generation provokes read and write errors.

Moreover, in the optical pickup apparatus of the desktop PC in FIG. 9, while a tilt servo is enable for making the objective lens follow in parallel with the warping of an optical disk, the optical pickup apparatus of the notebook PC in FIG. 10 can not perform this tilt servo, as the number of coil is limited, constituting a factor of inhibition to cope with a high speed, high record density of the optical disk.

The present invention has been devised in order to solve such problems of the prior art and has a first object of arranging the focus coil and the tracking coil to be point symmetrical by installing the objective lens at the center of them, stabilizing the weight balance and preventing the resonance from generating by the structure.

A second object of the present invention is enabling the tilt servo, which was impossible with the notebook PC of the prior art.

A third object of the present invention is allowing optical components to be arranged at a height position equivalent to the lens holder so that the thickness of the optical pickup apparatus be equal or inferior to 8.5 mm, in order to achieve an optical disk apparatus of 15 mm or less in thickness.

The present invention solves the aforementioned problems by a first composition of optical pickup apparatus composed to adjust the irradiation position of light beam to an optical disk by displacing an objective lens through a driving control of a lens holder holding the objective lens with a moving coil method, wherein:

an objective lens driving section is composed by arranging and fixing focus coils so that a pair of coil main bodies be symmetrical about the objective lens arranged at the middle of the lens holder, a second composition of the aforementioned first composition, wherein the coil main body of the focus coil is composed independently in a current path, a third composition of the aforementioned first composition, wherein the coil main body of the focus coils is composed integrally in the current path, a fourth composition of the aforementioned first or second composition, wherein respective sides of the lens holder is cantilever-supported by three suspension wires, and each individual focus coil and a tacking coil are supplied with driving current from the suspension wire, a fifth composition, wherein the suspension wire to be arranged between the upper and lower suspension wires is made softly, a sixth composition of an optical pickup apparatus composed to adjust the irradiation position of light beam to an optical disk by displacing an objective lens through a driving control of a lens holder holding the objective lens with a moving coil method, wherein coil main body of the focus coils is arranged in the lens holder symmetrically about the objective lens, a notch for securing an optical path is formed in an intermediate portion which is a side of the lens holder where the objective lens is positioned, a seventh composition of an optical pickup apparatus composed to adjust the irradiation position of light beam to an optical disk by displacing an objective lens through a driving control of a lens holder holding the objective lens with a moving coil method, wherein:

the lens holder is formed in a box so that a space be formed at the lower face of the objective lens, and a rising mirror for reflecting light beam incident from the side of the lens holder is received just under the objective lens in the space, an eighth composition of the aforementioned seventh composition, wherein a clearance groove is formed on the inner wall face of the lens holder corresponding to the top of the rising mirror, a ninth composition of the aforementioned seventh composition, composed so that the lowest portion of the objective lens is positioned more under the uppermost part of the rising mirror, when the lens holder holding the objective lens shifts downward, concerning the disposition relation between the objective lens and the rising mirror, tenth composition, wherein a stopper is installed on the lens holder, in a way to prevent the lens holder from oscillation.

BRIEF DESCRIPTION OF THE DRAWINGS

These and others and advantages of the present invention will become clear from following description with reference to the accompanying drawing, wherein.

| SYMBOLS | |
|---|---|
| 1 | Lens holder |
| 2 | Suspension holder |
| 3a, 3b, 3c | Suspension wire |
| 4 | Objective lens |
| 5, 6 | Coil reception section |
| 7a, 7b | Focus coil |
| 8a, 8b, 8c, 8d | Tracking coil |
| 9 | Notch |
| 10 | Rising mirror |
| 11 | Yoke base |
| 12 | Clearance groove |
| 13, 14 | Yoke piece |
| 15 | Permanent magnet |
| 16 | Optical component |

DETAILED DESCRIPTION OF THE PREFERRED EMBODIMENT

Figure 1:
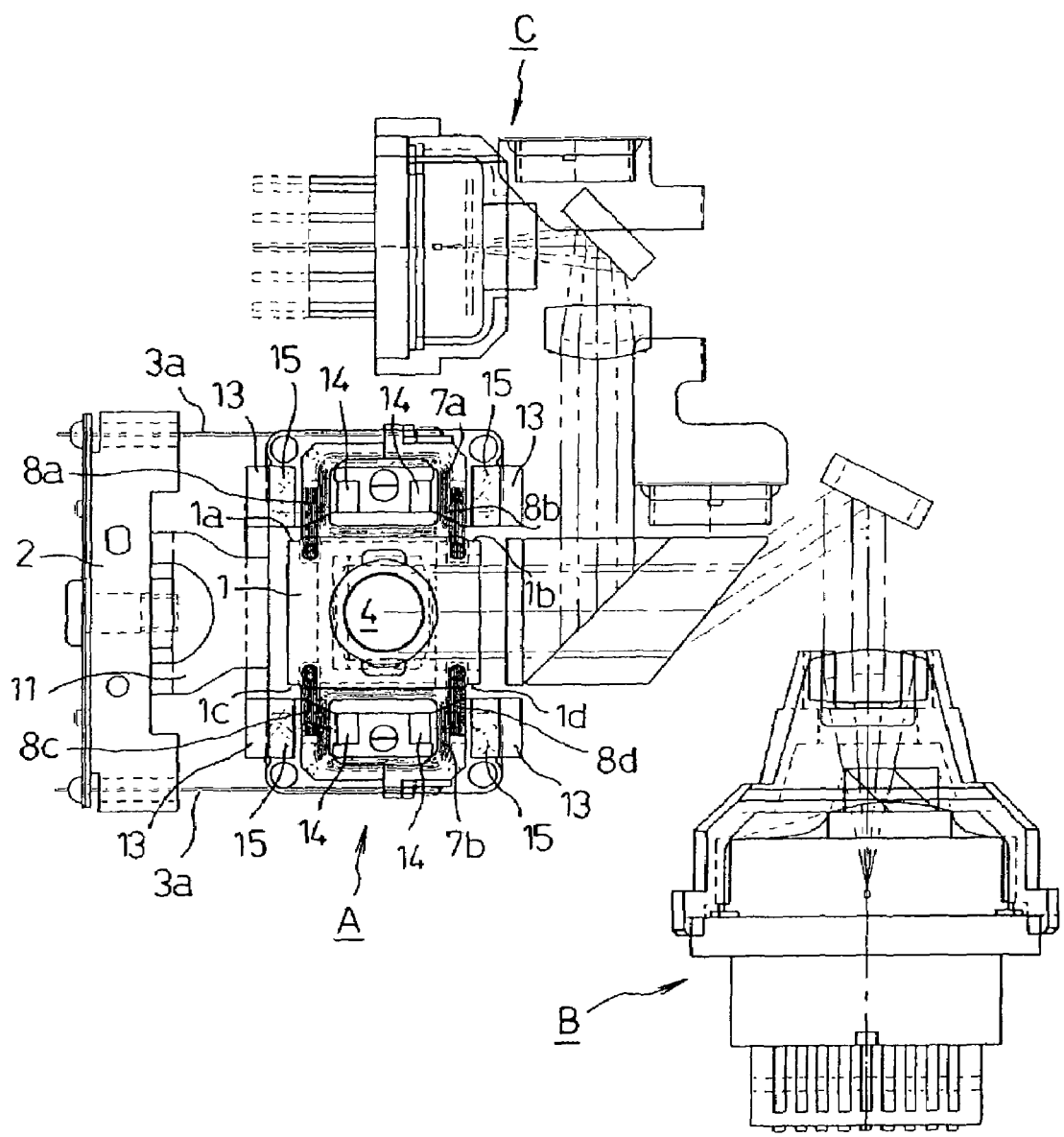
FIG. 1 is a plan view showing the arrangement state of an optical pickup apparatus and optical components of the present invention.

Now, the present invention shall be described in detail. FIG. 1 shows an arrangement state of an optical pickup apparatus A of the present invention, a semiconductor laser device B for DVD and a semiconductor laser device C for CD. The light beam emitted from the respective semiconductor laser devices forms light path to an objective lens of the optical pickup apparatus A passing through optical components of a plurality of mirror systems and lens systems.

Figure 2:
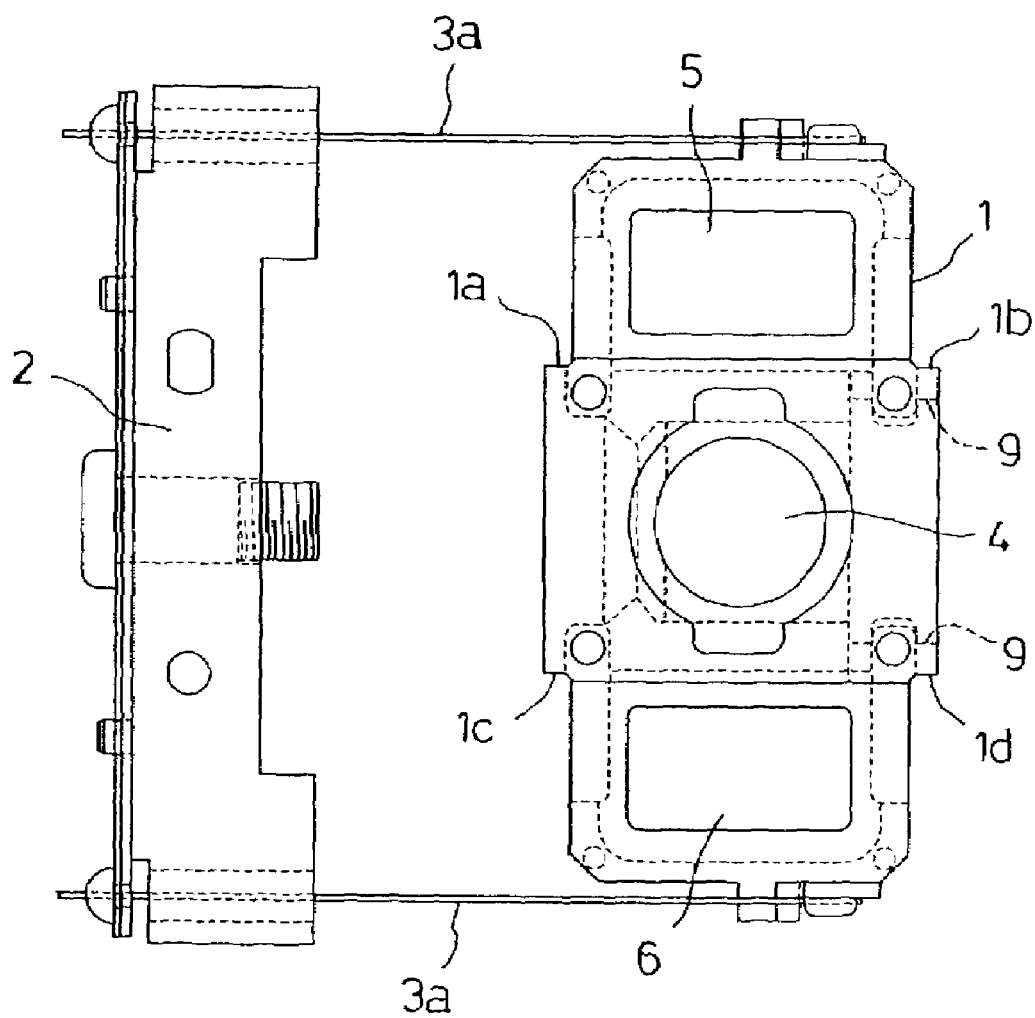
FIG. 2 is a plan view showing a lens holder of the present invention.
Figure 3:
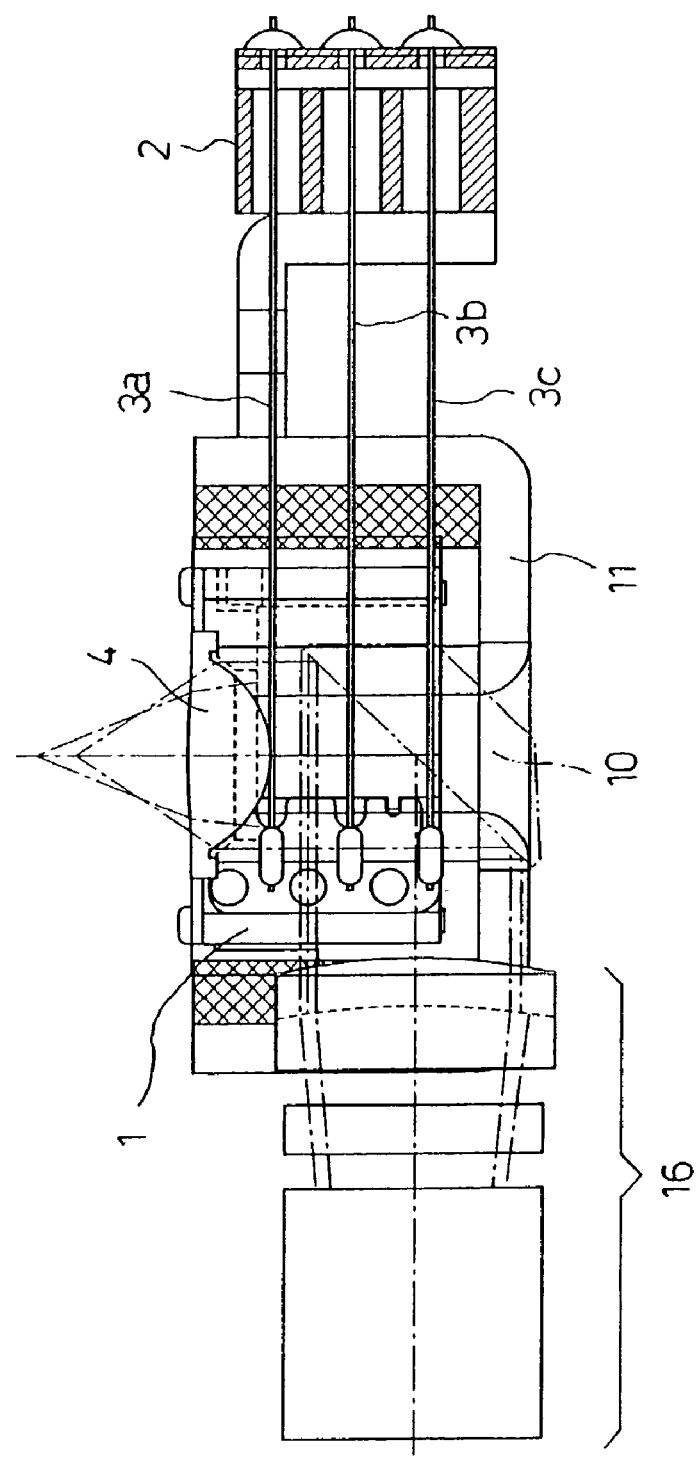
FIG. 3 illustrates the inner structure of the optical pickup apparatus of the present invention.

For the optical pickup apparatus A, as shown in FIG. 2 and FIG. 3, a lens holder 1 is cantilevered with three suspension wires 3a, 3b, 3c per one side by a suspension holder 2. The lens holder 1 holds an objective lens 4 in the middle, and coil reception section 5, 6 are formed up and down symmetrically in FIG. 2 about the objective lens. There, this coil reception section 5, 6 receives focus coil 7a, 7b and tracking coils 8a, 8b, 8c, 8d as shown in FIGS. 4–6 and 7. Thereby, an objective lens driving section is composed, respective arrangement of the focus coil and tracking coil become a point symmetrical arrangement about the objective lens 4, making the whole one excellent in weight balance. It should be appreciated that the focus coil and the tracking coil are affixed with glue, and furthermore, both coils are affixed with glue in the coil reception section.

Figure 6:
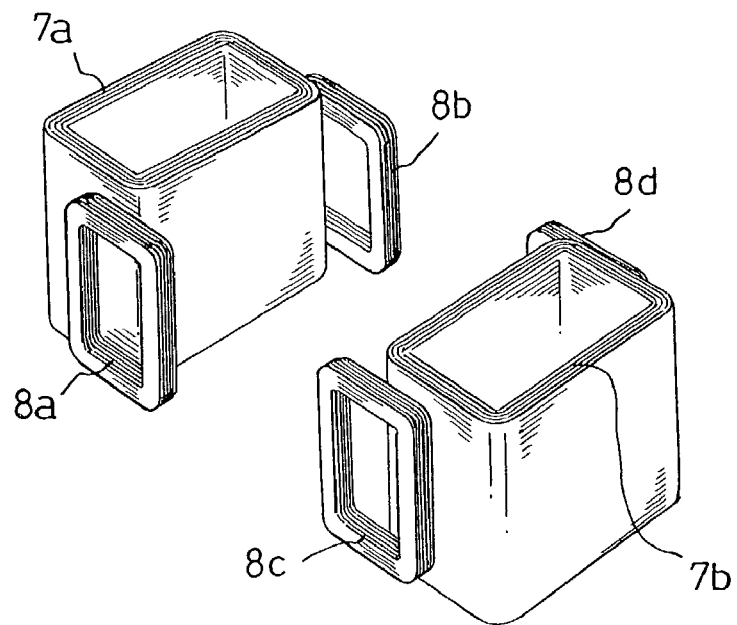
FIG. 6 is a perspective view showing a focus coil and tracking coil used for the present invention.
Figure 7:
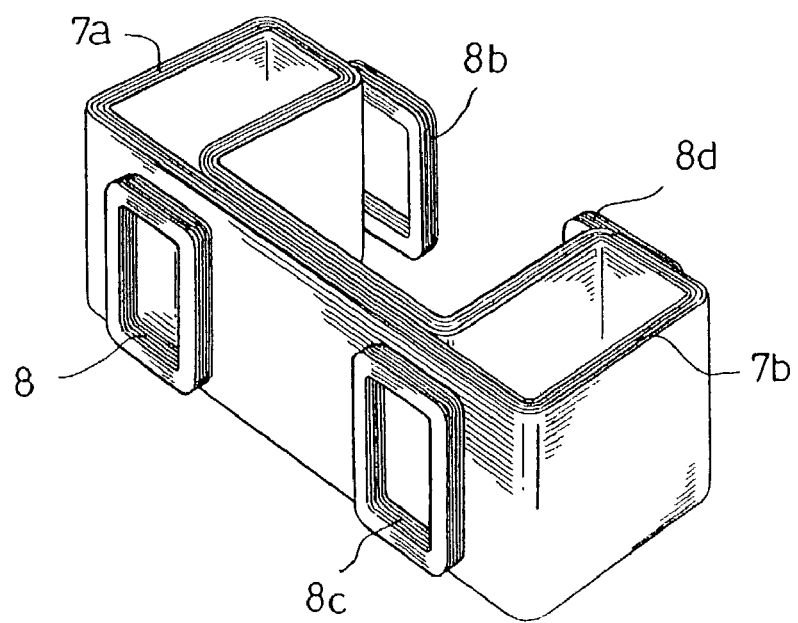
FIG. 7 is a perspective view showing another embodiment of focus coil and tracking coil used for the present invention.

The suspension wires 3a, 3b, 3c are provided with a function as lead constituting a power supply path to respective coils, one coil is connected to two of suspension wires of one side, while the other focus coil is connected to two of suspension wires of the other side. Then four tracking coils 8a, 8b, 8c, 8d are connected in series, and the terminal thereof is connected to the right and left suspension wires one by one. Consequently, respective tracking coils 8a, 8b, 8c, 8d are supplied with an identical control current; however, as the focus coil 7a, 7b can be supplied with different control currents individually, the tilt servo becomes possible so that the objective lens be parallel all the times even when the optical disk is biased. It should be appreciated that, though the focus coil and tracking coil of this embodiment are composed individually as shown in FIG. 6, it is also possible to compose integrally with an identical current path as shown in FIG. 7. In this case, the tilt servo can not be performed using the focus coil, but two suspension wires on one side will be sufficient.

By the way, when the lens holder is cantilevered by three suspension wires on one side as in this embodiment, it was confirmed that the suspension wire 3b arranged in the middle ends up to be a resistive element against the flexion of upper and lower suspension wires 3a, 3c, generating an unstable resonance in the focus direction. There, it is necessary to prevent an effect to the flexion from occurring by increasing the flexibility of this intermediate suspension wire 3b than the upper and lower suspension wires 3a, 3c.

To cope with this problem, for instance, by making the diameter of the intermediate suspension wire 3b equal or inferior to 80% in diameter than the upper and lower suspension wires 3a, 3c, the spring constant thereof becomes about 41% allowing to deform flexibly, Also, in case of composing the intermediate suspension wire 3b by adopting those of the same diameter as the upper and lower suspension wires 3a, 3c, flexibility can be imparted by creasing an intermediate portion thereof.

Figure 4:
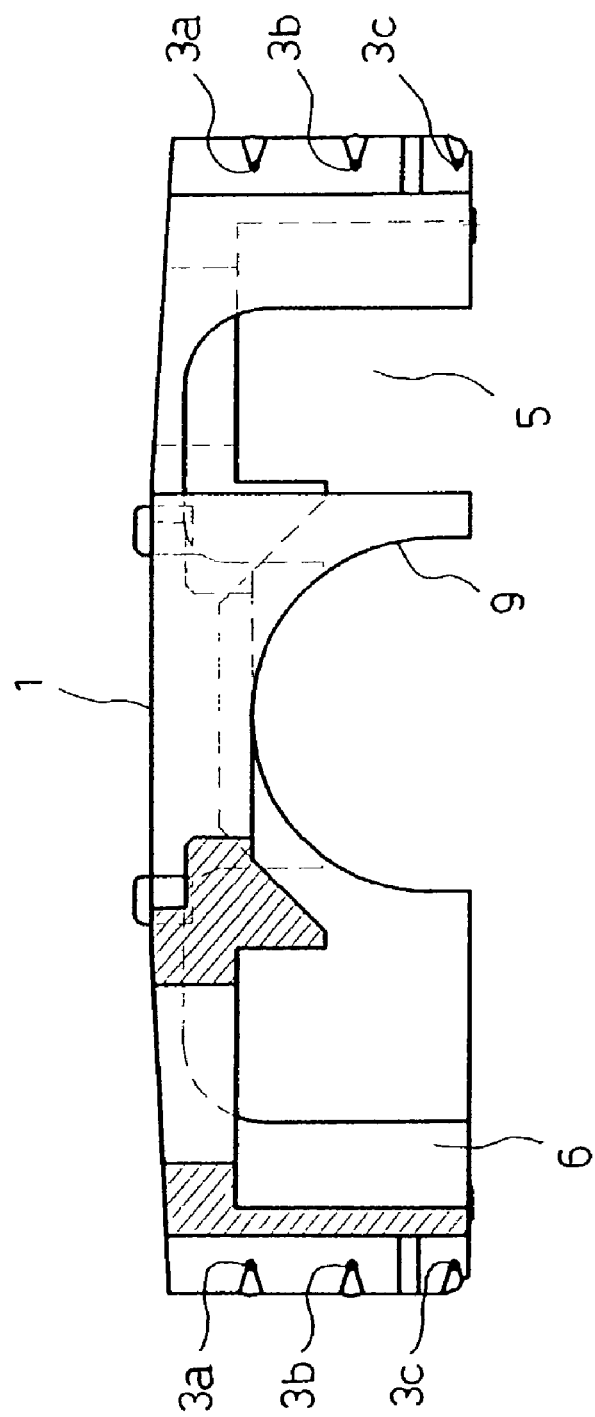
FIG. 4 is a partial section side view for illustrating the composition of the lens holder of the present invention.
Figure 5:
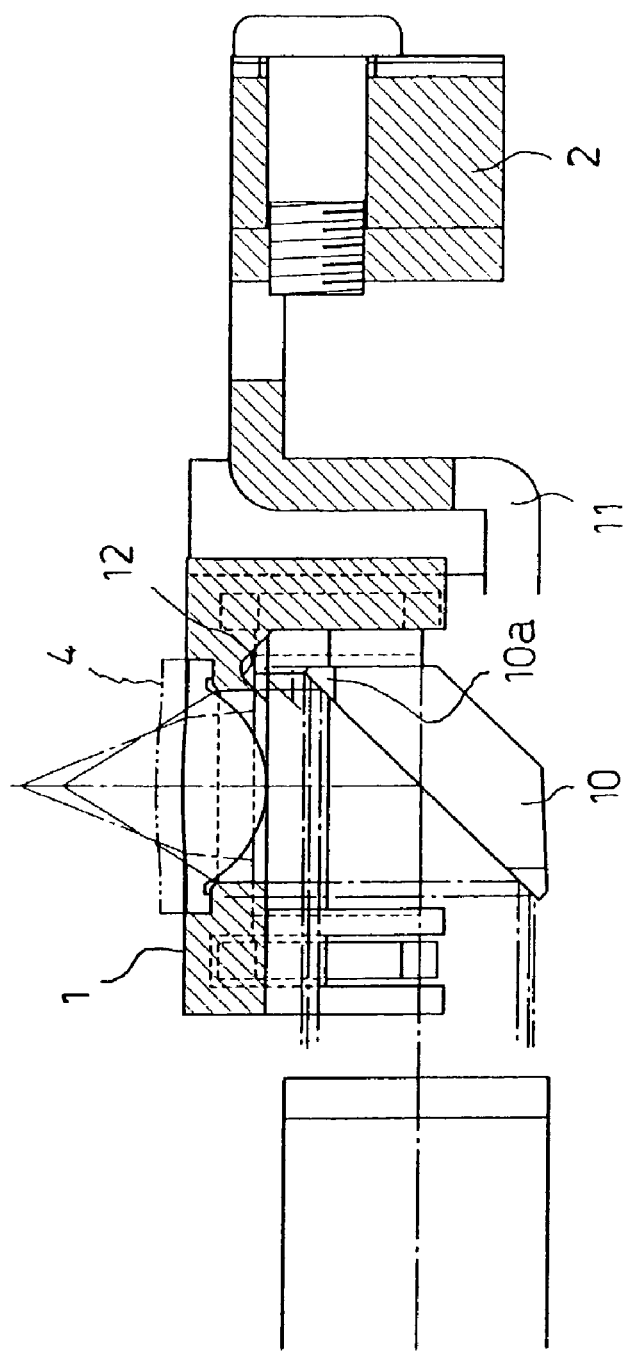
FIG. 5 illustrates the inner structure of the lens holder of the present invention.

Next, as for the lens holder 1 supported by an end portion of the suspension wires 3a, 3b, 3c, a notch 9 is formed on a side face introducing the light beam into the objective lens 4 as shown in FIG. 4. This lens holder 1 is formed into a box so that a space is formed on the lower face of the objective lens as shown in FIG. 5, and the rising mirror 10 fixed to a frame body (not shown) arranged under the yoke base 11 is received in the space. Then, a clearance groove 12 is formed on the inner wall face of the lens holder 1 so that this polarizing lens 10 can be arranged at a high position in the space, and it is so composed that the top 10a of the mirror 10 fits into this clearance groove. Thereby, even when the lens holder 1 descends in the focus serve, a sufficient distance thereof can be obtained by the clearance groove 12, allowing to arrange relatively the rising mirror 10 at the high position in the space, and contribute to the flattening of the whole optical pickup apparatus. It should be appreciated that it constitutes a composition allowing the lowermost portion of the objective lens 4 held by the lens holder to shift in order to be positioned lower than the top (uppermost portion) of the rising mirror.

Next, the yoke base 11 for fixing the suspension holder 2 at the end portion is provided with an upright yoke piece 13 . . . , 14 . . . and a permanent magnet 15 is fixed to one yoke piece 13. Therefore, a magnetic circuit is formed between the permanent magnet 15 . . . and the yoke piece 14 . . . , and the focus coil 7a, 7b and the tracking coil 8a, 8b, 8c, 8d are arranged by interposing in this magnetic circuit as shown in FIG. 1. Here, in case of interposing both coils in the magnetic circuit, they may be arranged so that all of both sides of the focus coils 7a, 7b receives the effect of the magnetic field; however, the tracking coil 8a, 8b, 8c, 8d are attached displacing from the center of the focus coil 7a, 7b as shown in FIG. 1 and FIG. 6, so that they receive the effect of the magnetic field only at one side.

As described hereinabove, when the optical pickup apparatus of the present invention is assembled as shown in FIG. 3, the focus coil 7a, 7b and the tracking coils 8a, 8b,8c, 8d to be arranged point-symmetrically about the objective lens 4. There, the focus coil 7a, 7b comes into a state being supplied with control current individually from the suspension wire, and the whole of the rising mirror 10 is received in the lens holder 1. Thereby, lens or other optical components 16 to be disposed in the vicinity of the lens holder 1 also come to be received within the range of the thickness of the lens holder 1 and the yoke base 11.

Also, the lens holder 1 of optical pickup apparatus of the present invention extends stoppers 1a, 1b, 1c, 1d from the main body thereof and makes them into contact with the permanent magnet 15. This is to prevent the lens holder 1 in the floating state without any restriction from oscillating in the tracking direction when an impact is applied from the outside, and the suspension wire 3a . . . from plastically deforming. It should be appreciated that, during the normal and stable operation, as there is a clearance between the stopper and the permanent magnet, the stopper and the permanent magnet do not come into contact, even when the lens holder 1 oscillates in the tracking direction by the tracking operation during the control.

In short, by adopting such a composition, the suspension wire 3a . . . would not be affected even when the lens holder 1 comes into a state of oscillation by an impact from the exterior, because the range of this oscillation is limited to a range where the stopper 1a, 1b, 1c, 1d comes into contact with the permanent magnet 15 . . . In case of this embodiment, as stoppers are installed at four points approximately in point symmetry about the objective lens 4, the stoppers of two points on one side come simultaneously into contact with the permanent magnet, and thereby prevent rotation moment from occurring. It should be appreciated that such stopper may further be installed over and under the lens holder, for example, without limiting to the four points.

Figure 8:
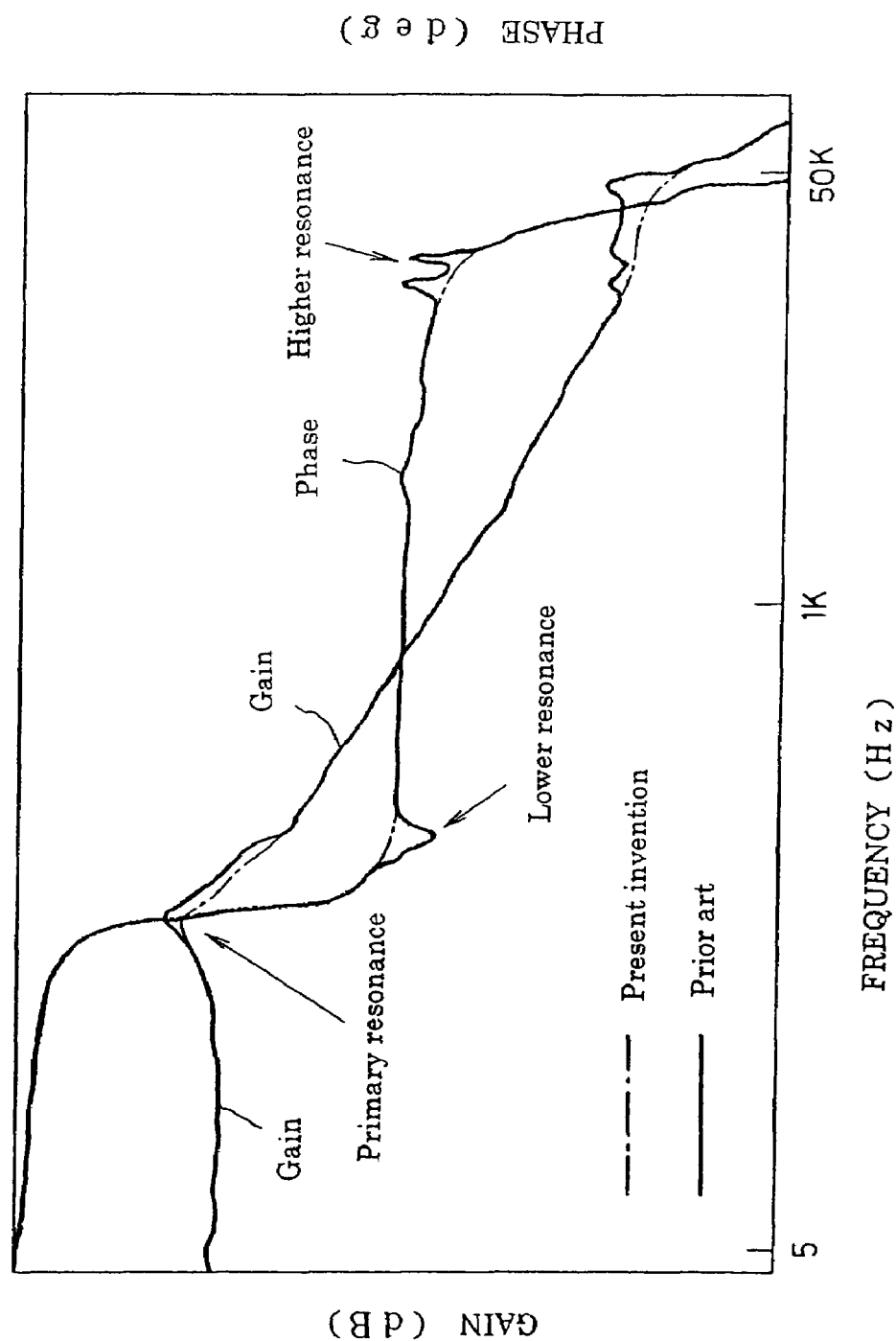
FIG. 8 shows the comparison of frequency response characteristics during the tracking direction driving of optical pickup apparatus of the present invention and the prior art.
Figure 9:
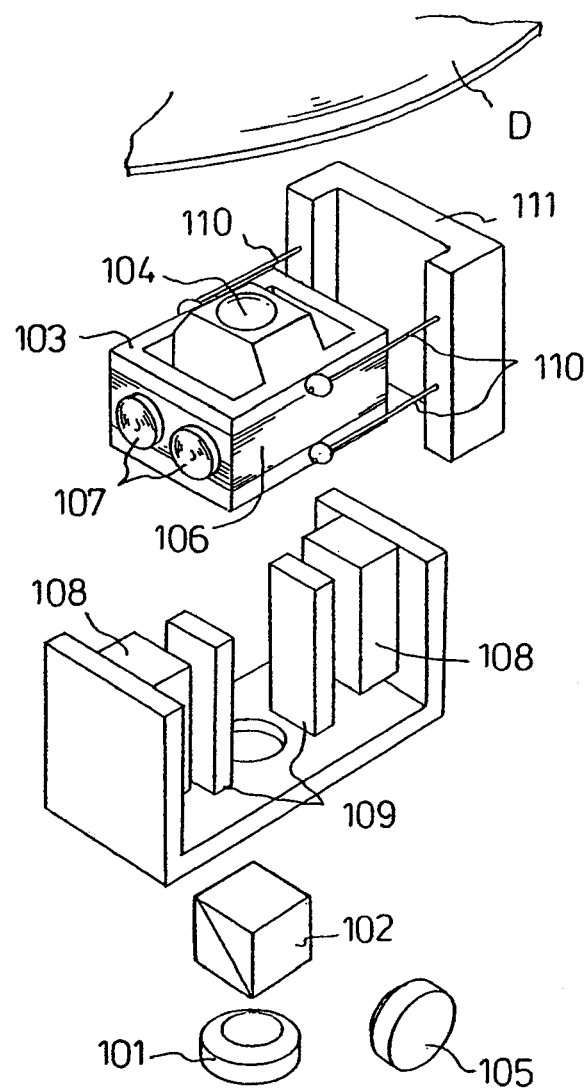
FIG. 9 is a perspective view showing the structure of the optical pickup apparatus adopted for the desktop PC of the prior art.
Figure 10:
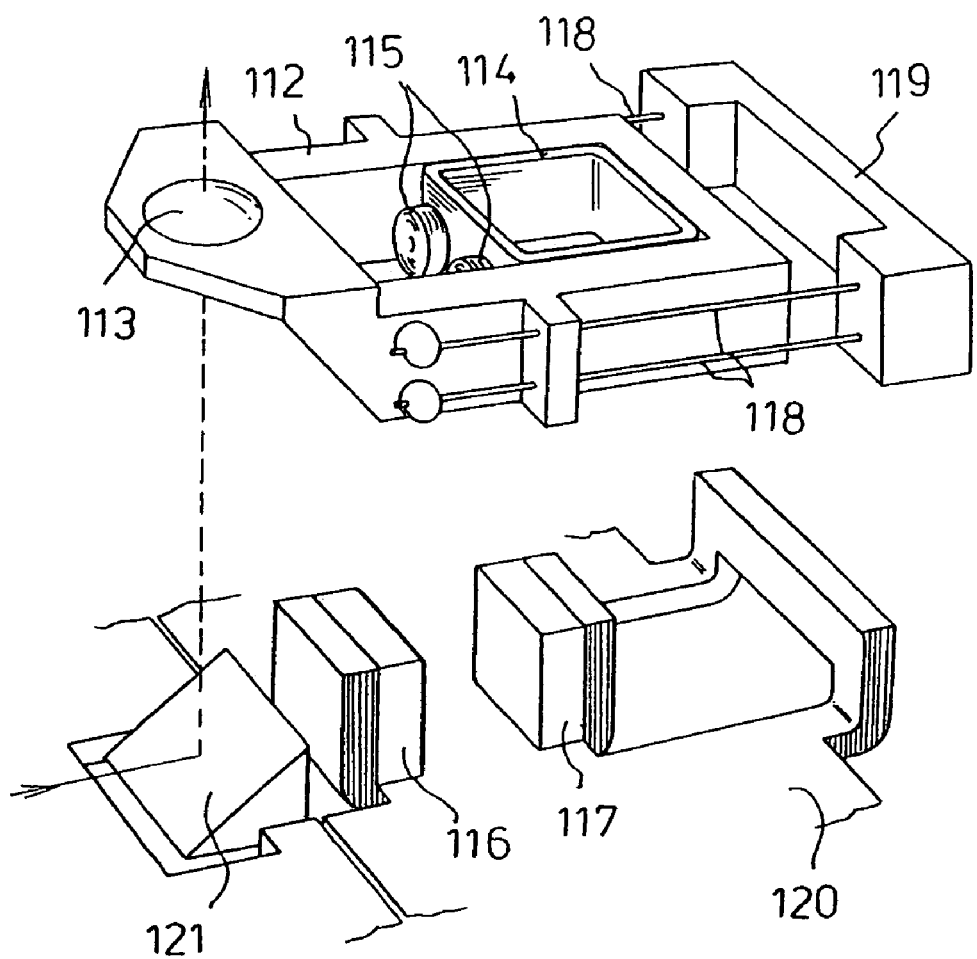
FIG. 10 is a perspective view showing the structure of the optical pickup apparatus adopted for the notebook PC of the prior art.

FIG. 8 shows the comparison of frequency response characteristics during the tracking direction driving of optical pickup apparatus of the present invention and the prior art, the horizontal axis corresponds to the driving frequency in the tracking direction (Hz), the left vertical axis the gain (dB), the right vertical axis the phase (deg) and the characteristics of the portion improved by the present invention is shown by an alternate long and short dash line.

As evident from the same drawing, in the optical pickup apparatus of the prior art, there was a problem that lower resonance and higher resonance occur in addition to primary resonance, and gain and phase vary discontinuously, thereby lowering the tracking characteristics. In contrast, in the present invention, the focus coil and tracking coil are arranged symmetrically about the lens, and what is more, the suspension wire situated at the middle, among three suspension wires on respective side faces of the lens holder is made flexible, allowing to control the gain and phase variation in the lower resonance and the higher resonance, thereby improving the tracking characteristics.

It should be appreciated that, similarly as the frequency response characteristics during the tracking direction driving shown in FIG. 8, the frequency response characteristics are improved even during the focus direction driving, allowing to control the gain and phase variation in the lower resonance and the higher resonance, thereby improving the focus characteristics.

As described in detail hereinabove, according to the present invention, the inclination of resonance of the lens holder provoked by structural problems can be prevented, because the weight balance is stabilized by arranging the focus coil and tracking coil in point symmetry about the objective lens. Consequently, it becomes possible to make even the notebook PC cope with the high speed, and high record density.

In addition, according to the present invention, distinct focus coils can be supplied with different control current, because focus coils are composed to be arranged in symmetry by dividing about the objective lens, thereby enabling the tilt servo, and allowing to prevent read and write errors provoked by the warping of optical disk or others.

Still further, according to the present invention, as the light path to the objective lens is made to be formed on the side face of the lens holder, the arrangement of optical components can be arranged at a height equivalent to the lens holder, whereby the whole thickness of the optical pickup apparatus can be reduced extremely, and an optical pickup apparatus extremely useful particularly for the notebook PC can be provided.

While the presently preferred embodiment of the present invention has been shown and described, it will be understood that the present invention is not limited thereto, and that various changes and modification may be made by those skilled in the art without departing from the scope of the invention as set forth in the appended claims.

What is claimed is:

1. An optical pickup apparatus operative to adjust an irradiation position of a light beam on an optical disk by displacing a lens holder, and thereby displacing an objective lens held by said lens holder, by a moving coil drive control, wherein:
   said lens holder defines a space at the lower face of said objective lens; and
   a rising mirror for reflecting a light beam incident from the side of said lens holder is received just under said objective lens in said space, so that, when said lens holder shifts downward, the lowest portion of said objective lens is positioned lower than the uppermost part of said rising mirror.

2. The optical pickup apparatus of claim 1, further comprising:
   an objective lens driving section comprising focus coils ranged so that a pair of said focus coils' main bodies are symmetric about said objective lens; and
   a pair of tracking coils at respective sides of each of said focus coils.

3. The optical pickup apparatus of claim 2, wherein:
   respective sides of said lens holder are cantilever-supported by three suspension wires; and
   each said focus coil and a serially connected tacking coil are supplied with driving current from at least one of said suspension wires.

4. The optical pickup apparatus of claim 3, wherein:
   said three suspension wires comprise an upper suspension wire, a lower suspension wire and a suspension wire between the upper and lower suspension wire; and
   said suspension wire between the upper and lower suspension wires is more flexible than the upper and lower suspension wires.

5. The optical pick up apparatus of claim 1, wherein:
   said lens holder is cantilevered with three suspension wires on each side of said lens holder; and
   one of said three suspension wires is creased to make the one suspension wire more flexible than the other two suspension wires.

6. The optical pick up apparatus of claim 5, wherein:
   said three suspension wires comprise an upper suspension wire arranged in the upper side of said lens holder, an intermediate suspension wire arranged in the middle side of said lens holder and a lower suspension wire arranged in the lower side of said lens holder; and
   said intermediate suspension wire is creased to make said intermediate suspension wire more flexible than said upper and lower suspension wires.

7. The optical pickup apparatus of claim 1, further comprising:
   a coil main body of a focus coil arranged in said lens holder symmetrically about said objective lens; and
   wherein said lens holder defines a notch in a side of said lens holder for providing an optical path to said objective lens.

8. The optical pickup apparatus of claim 1, wherein said lens holder defines a clearance groove on the inner wall of said lens holder and corresponding to the top of said rising mirror.

9. The optical pickup apparatus of claim 1, further comprising a stopper on said lens holder to prevent said lens holder from oscillating.

10. An optical pickup apparatus operative to adjust an irradiation position of a light beam on an optical disk by displacing a lens holder, and thereby an objective lens held by said lens holder, by a moving coil drive control, wherein:
    said lens holder is cantilevered with three suspension wires on each aide of said lens holder, one of said three suspension wires being creased to make said one suspension wire more flexible than said other two suspension wires;
    said lens holder defines a space at the lower face of said objective lens; and
    a rising mirror for reflecting a light beam incident from the side of said lens holder is received just under said objective lens in said space, so tat when said lens holder shifts downward, the lowest portion of said objective lens is positioned lower than the uppermost part of said rising mirror.

11. The optical pickup apparatus of claim 10, wherein said lens holder defines a clearance groove on the inner wall of said lens holder and corresponding to the top of said rising mirror.

12. The optical pickup apparatus of claim 10, wherein, when said lens holder shifts downward, the lowest portion of said objective lens is positioned lower than the uppermost part of said rising mirror.

* * * * *

UNITED STATES PATENT AND TRADEMARK OFFICE
CERTIFICATE OF CORRECTION

PATENT NO. : 7,082,084 B2 Page 1 of 1
APPLICATION NO. : 10/254276
DATED : July 25, 2006
INVENTOR(S) : Hidetoshi Kabasawa It is certified that error appears in the above-identified patent and that said Letters Patent is hereby corrected as shown below:

Column 5, lines 1-2, "FIGS. 4-6 and 7" should read --FIGS. 6 and 7--;

Column 7, claim 2, line 57, "ranged so that" should read --arranged so that--;

Column 8, claim 10, line 44, "each aide" should read --each side--; and

Column 8, claim 10, line 53, "so tat when" should read --so that, when--.

Signed and Sealed this

Third Day of July, 2007

JON W. DUDAS
*Director of the United States Patent and Trademark Office*